(12) United States Patent
Rittberg et al.

(10) Patent No.: US 11,181,617 B2
(45) Date of Patent: Nov. 23, 2021

(54) ULTRA SHORT RANGE RADAR SENSOR SYSTEMS AND METHODS

(71) Applicant: GM GLOBAL TECHNOLOGY OPERATIONS LLC, Detroit, MI (US)

(72) Inventors: Eyal Rittberg, Petach Tikva (IL); Arye Lerner, Herzliya (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 301 days.

(21) Appl. No.: 16/436,038

(22) Filed: Jun. 10, 2019

(65) Prior Publication Data

US 2020/0386858 A1 Dec. 10, 2020

(51) Int. Cl.

| | |
|---|---|
| *G01S 7/41* | (2006.01) |
| *G01S 13/04* | (2006.01) |
| *G01S 13/08* | (2006.01) |
| *B62D 6/00* | (2006.01) |
| *B60T 7/12* | (2006.01) |
| *B60Q 9/00* | (2006.01) |
| *B60W 10/20* | (2006.01) |
| *B60W 10/18* | (2012.01) |
| *B60W 10/04* | (2006.01) |
| *G05D 1/02* | (2020.01) |
| *G01S 13/931* | (2020.01) |

(52) U.S. Cl.
CPC .............. *G01S 7/414* (2013.01); *B60Q 9/00* (2013.01); *B60T 7/12* (2013.01); *B60W 10/04* (2013.01); *B60W 10/18* (2013.01); *B60W 10/20* (2013.01); *B62D 6/00* (2013.01); *G01S 13/04* (2013.01); *G01S 13/08* (2013.01); *G01S 13/931* (2013.01); *G05D 1/0257* (2013.01); *B60W 2420/52* (2013.01); *B60W 2710/18* (2013.01); *B60W 2710/20* (2013.01); *G01S 2013/9318* (2020.01); *G01S 2013/9319* (2020.01); *G01S 2013/93185* (2020.01)

(58) Field of Classification Search
CPC ......................................................... G01S 7/414
See application file for complete search history.

(56) References Cited

U.S. PATENT DOCUMENTS

| | | | | |
|---|---|---|---|---|
| 10,439,298 | B2* | 10/2019 | Kirino | ................. H01Q 1/3233 |
| 2020/0278438 | A1* | 9/2020 | Huang | .................... G01S 13/56 |
| 2020/0386858 | A1* | 12/2020 | Rittberg | .................... B60T 7/12 |

* cited by examiner

*Primary Examiner* — Michael A Berns
(74) *Attorney, Agent, or Firm* — Harness, Dickey & Pierce, P.L.C.

(57) ABSTRACT

A radar sensor includes: a transmitter configured to transmit radar via a transmit antenna; a receiver configured to receive signals reflected back to the radar sensor via a receive antenna; a profile module configured to generate an energy profile including a plurality of points for a plurality of distances from the radar sensor, respectively, each of the points including an energy of the signals reflected back to the radar sensor for that one of the plurality of distances; a minimums module configured to identify ones of the plurality of points having local minimums of energy; and a curve module configured to, based on the plurality of points having local minimums of energy, generate an equation representative of a curve fit to the plurality of points having local minimums of energy, the equation relating distance from the radar sensor to baseline energy of the signals reflected back to the radar sensor.

17 Claims, 8 Drawing Sheets

ULTRA SHORT RANGE RADAR SENSOR SYSTEMS AND METHODS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicles and more particularly to object detection systems and methods of identifying targets using ultra short range radar (USRR) sensors.

Vehicles include one or more torque producing devices, such as an internal combustion engine and/or an electric motor. A passenger of a vehicle rides within a passenger cabin (or passenger compartment) of the vehicle.

Autonomous driving systems drive a vehicle completely independent of a human driver. For example, autonomous driving systems control the acceleration, brake, and steering systems of a vehicle independent of a driver.

Semiautonomous driving systems drive a vehicle partially independent of a human driver. For example, a semiautonomous driving system may control the steering system independent of a driver while relying on the driver to set a target speed for the semiautonomous driving system to achieve by controlling the acceleration and brake systems.

SUMMARY

In a feature, a radar sensor includes: a transmitter configured to transmit radar signals in a predetermined field of view (FOV) via a transmit antenna; a receiver configured to receive signals reflected back to the radar sensor via a receive antenna; a profile module configured to generate an energy profile including a plurality of points for a plurality of distances from the radar sensor, respectively, each of the points including an energy of the signals reflected back to the radar sensor for that one of the plurality of distances; a minimums module configured to identify ones of the plurality of points having local minimums of energy; and a curve module configured to, based on the plurality of points having local minimums of energy, generate an equation representative of a curve fit to the plurality of points having local minimums of energy, where the equation relates distance from the radar sensor to baseline energy of the signals reflected back to the radar sensor.

In further features, the minimums module is configured to generate the equation using a least squares algorithm.

In further features, the minimums module is configured to generate the equation using a least mean squares algorithm.

In further features, a target module is configured to: determine a baseline energy for one of the plurality of points at one of the plurality of distances from the radar sensor using the equation and the one of the plurality of distances; determine a first threshold value based on the baseline energy and a first predetermined value; and output a target signal indicative of the presence of a target at the one of the distances from the radar sensor when the energy at the one of the plurality of distances is greater than the first threshold value.

In further features, the target module is configured to: determine a second threshold value based on the baseline energy and a second predetermined value; and selectively output the target signal indicative of the presence of a target at the one of the distances from the radar sensor when the energy at the one of the plurality of distances is greater than the second threshold value.

In further features, the target module is configured to output the target signal indicative of the presence of a target at the one of the distances from the radar sensor when the energy at the one of the plurality of distances is less than the first threshold value and greater than the second threshold value.

In further features, the first predetermined value is greater than the second predetermined value.

In further features, the target module is configured to set the first threshold value based on the baseline energy plus the first predetermined value.

In further features, the target module is configured to set the second threshold value based on the baseline energy plus the second predetermined value.

In further features, the target module is configured to set the first threshold value based on the baseline energy plus the first predetermined value.

In further features, a vehicle includes the radar sensor and a steering control module configured to selectively adjust steering of the vehicle based on the target signal.

In further features, a vehicle includes the radar sensor and a brake control module configured to selectively apply brakes of the vehicle based on the target signal.

In further features, a vehicle includes the radar sensor and an acceleration control module configured to selectively decelerate the vehicle based on the target signal.

In further features, a vehicle includes the radar sensor and a driver warning module configured to selectively output a warning via a driver warning device based on the target signal.

In further features, a vehicle includes the radar sensor and a steering control module configured to selectively adjust steering of the vehicle based on the target signal; a brake control module configured to selectively apply brakes of the vehicle based on the target signal; and an acceleration control module configured to selectively decelerate the vehicle based on the target signal.

In further features, the equation is a polynomial equation.

In further features, the radar sensor further includes the transmit antenna and the receive antenna.

In a feature, a radar sensor includes: a transmit antenna; a transmitter configured to transmit radar signals in a predetermined field of view (FOV) via the transmit antenna; a receive antenna; a receiver configured to receive signals reflected back to the radar sensor via the receive antenna; a profile module configured to generate an energy profile including a plurality of points for a plurality of distances from the radar sensor, respectively, each of the points including an energy of the signals reflected back to the radar sensor for that one of the plurality of distances; a minimums module configured to identify ones of the plurality of points having local minimums of energy; and a curve module configured to, based on the plurality of points having local minimums of energy, generate a polynomial equation representative of a curve fit to the plurality of points having local minimums of energy, where the polynomial equation relates distance from the radar sensor to baseline energy of the signals reflected back to the radar sensor.

In further features, a target module is configured to: determine a baseline energy for one of the plurality of points at one of the plurality of distances from the radar sensor using the polynomial equation and the one of the plurality of distances; determine a first threshold value based on the baseline energy and a first predetermined value; determine a second threshold value based on the baseline energy and a second predetermined value that is less than the first predetermined value; and selectively output a target signal indicative of the presence of a target at the one of the distances from the radar sensor based on at least one of: a first comparison of the energy at the one of the plurality of distances and the first threshold value; and a second comparison of the energy at the one of the plurality of distances and the second threshold value.

In further features, a vehicle includes the radar sensor and at least one of: a steering control module configured to selectively adjust steering of the vehicle based on the target signal; a brake control module configured to selectively apply brakes of the vehicle based on the target signal; an acceleration control module configured to selectively decelerate the vehicle based on the target signal; and a driver warning module configured to selectively output a warning via a driver warning device based on the target signal.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A vehicle may include one or more ultra short range radar (USRR) sensors. For example, the vehicle may include one or more forward facing USRR sensors. The vehicle may additionally or alternatively include one or more rear facing USRR sensors. USRR sensors are configured to identify targets (objects of a predetermined volume) that are located within a predetermined distance range (e.g., 0-15 meters) of an exterior of the vehicle. USRR sensors, however, may incorrectly identify non-targets as targets when multiple targets are present in close proximity to each other.

According to the present application, a USRR sensor determines an energy profile based on signals reflected back to the USRR sensor by targets within a field of view (FOV) of the USRR sensor. The energy profile includes a plurality of energies at a plurality of distances from the USRR sensor, respectively.

The USRR sensor determines local minimums of the energy profile and determines an equation (e.g., a polynomial equation) for a curve fit to the local minimums. For ones of the points suspected by the USRR sensor to be indicative of a target, the USRR sensor determines first and second threshold energy values based on the distances of those ones of the suspected points, respectively. The USRR sensor determines whether the ones of the suspected points correspond to targets based on whether the ones of the points are local maximums and whether the points are greater than one or both of the first and second threshold values.

The USRR sensor of the present application provides more accurate target detection when the FOV of the USRR sensor is cluttered and/or noisy. The USRR sensor also provides more accurate detection despite hardware imperfections of the USRR sensor (e.g., associated with the antennas, transmitter, receiver, and/or other hardware).

Figure 1:
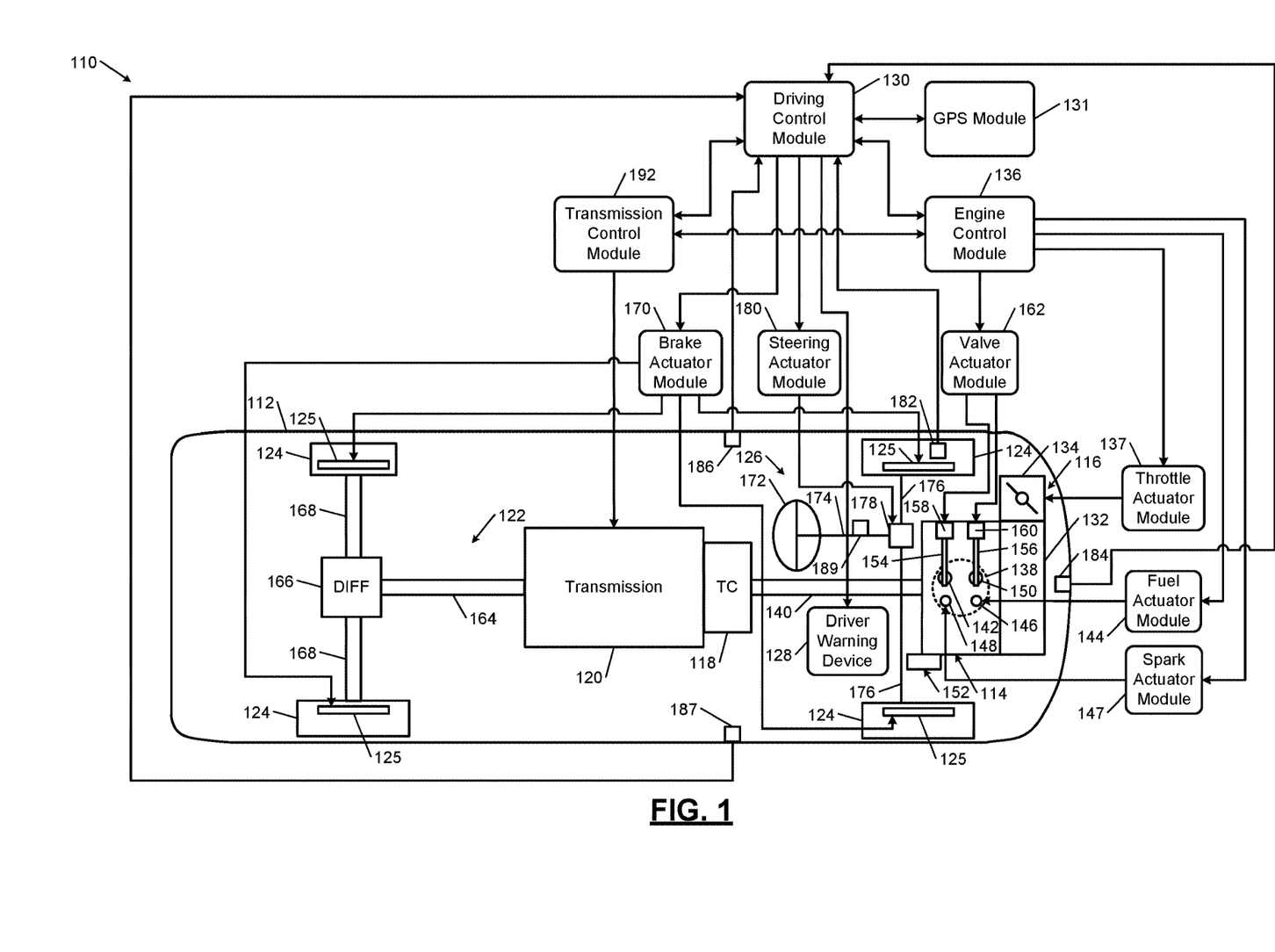
FIG. 1 is a functional block diagram of an example vehicle system.

FIG. 1 includes a functional block diagram including an example vehicle system. A vehicle 110 includes a vehicle body 112, an engine 114, an intake system 116, a torque converter 118, a transmission 120, a driveline 122, wheels 124, friction brakes 125, a steering system 126, and a driver warning device 128. The engine 114 combusts an air/fuel mixture to produce drive torque for the vehicle 110. The amount of drive torque produced by the engine 114 is based on a driver input and/or a first input from a driving control module (DCM) 130. The driver input may be a signal indicating a position of an accelerator pedal. The first input from the DCM 130 may be a target vehicle acceleration.

The DCM 130 may adjust the target vehicle acceleration, for example, to maintain a target vehicle speed or to maintain a predetermined distance between the vehicle and an object in front of the vehicle 110. The DCM 130 may determine the target vehicle speed based on the location of the vehicle 110 and a speed limit for the road on which the vehicle 110 is travelling. The DCM 130 may determine the speed limit, for example, based on an input received from a global positioning system (GPS) module 131 or by identifying the speed limit posted on a speed limit sign from an image captured using a camera. The GPS module 131 may be onboard (e.g., part of) the vehicle 110 or the GPS module 131 may be remote from (e.g., separate from) the vehicle 110. The GPS module 131 includes a transceiver for communicating with a GPS satellite.

Air is drawn into the engine 114 through the intake system 116. The intake system 116 includes an intake manifold 132 and a throttle valve 134. The throttle valve 134 may include a butterfly valve having a rotatable blade. An engine control module (ECM) 136 controls a throttle actuator module 137, and the throttle actuator module 137 regulates opening of the throttle valve 134 to control the amount of air drawn into the intake manifold 132.

Air from the intake manifold 132 is drawn into cylinders of the engine 114. While the engine 114 may include multiple cylinders, for illustration purposes a single representative cylinder 138 is shown. For example only, the engine 114 may include 2, 3, 4, 5, 6, 8, 10, and/or 12 cylinders. The ECM 136 may deactivate some of the cylinders, which may improve fuel economy under certain engine operating conditions.

The engine 114 may operate using a four-stroke cycle. The four strokes, described below, are named the intake stroke, the compression stroke, the combustion stroke, and the exhaust stroke. During each revolution of a crankshaft 140, two of the four strokes occur within the cylinder 138. Therefore, two crankshaft revolutions are necessary for the cylinder 138 to experience all four of the strokes.

During the intake stroke, air from the intake manifold 132 is drawn into the cylinder 138 through an intake valve 142.

The ECM 136 controls a fuel actuator module 144, which regulates fuel injections performed by a fuel injector 146 to achieve a target air/fuel ratio. Fuel may be injected into the intake manifold 132 at a central location or at multiple locations, such as near the intake valve 142 of each of the cylinders. In various implementations, fuel may be injected directly into the cylinders or into mixing chambers associated with the cylinders. The fuel actuator module 144 may halt injection of fuel to cylinders that are deactivated.

The injected fuel mixes with air and creates an air/fuel mixture in the cylinder 138. During the compression stroke, a piston (not shown) within the cylinder 138 compresses the air/fuel mixture. The engine 114 may be a compression-ignition engine, in which case compression in the cylinder 138 ignites the air/fuel mixture. Alternatively, the engine 114 may be a spark-ignition engine, in which case a spark actuator module 147 energizes a spark plug 148 to generate a spark in the cylinder 138 based on a signal from the ECM 136, which ignites the air/fuel mixture. The timing of the spark may be specified relative to the time when the piston is at its topmost position, referred to as top dead center (TDC). The spark actuator module 147 may be controlled by a spark timing signal specifying how far before or after TDC to generate the spark. Because piston position is directly related to crankshaft rotation, operation of the spark actuator module 147 may be synchronized with crankshaft angle. In various implementations, the spark actuator module 147 may halt provision of spark to deactivated cylinders.

Generating the spark may be referred to as a firing event. The spark actuator module 147 may have the ability to vary the timing of the spark for each firing event. The spark actuator module 147 may even be capable of varying the spark timing for a next firing event when the spark timing signal is changed between a last firing event and the next firing event. In various implementations, the engine 114 may include multiple cylinders and the spark actuator module 147 may vary the spark timing relative to TDC by the same amount for all cylinders in the engine 114.

During the combustion stroke, combustion of the air/fuel mixture drives the piston down, thereby driving the crankshaft 140. The combustion stroke may be defined as the time between the piston reaching TDC and the time at which the piston returns to bottom dead center (BDC). During the exhaust stroke, the piston begins moving up from BDC and expels the byproducts of combustion through an exhaust valve 150. The byproducts of combustion are exhausted from the vehicle via an exhaust system 152.

The intake valve 142 may be controlled by an intake camshaft 154, while the exhaust valve 150 may be controlled by an exhaust camshaft 156. In various implementations, multiple intake camshafts (including the intake camshaft 154) may control multiple intake valves (including the intake valve 142) for the cylinder 138 and/or may control the intake valves (including the intake valve 142) of multiple banks of cylinders (including the cylinder 138). Similarly, multiple exhaust camshafts (including the exhaust camshaft 156) may control multiple exhaust valves for the cylinder 138 and/or may control exhaust valves (including the exhaust valve 150) for multiple banks of cylinders (including the cylinder 138).

The time at which the intake valve 142 is opened may be varied with respect to piston TDC by an intake cam phaser 158. The time at which the exhaust valve 150 is opened may be varied with respect to piston TDC by an exhaust cam phaser 160. A valve actuator module 162 may control the intake and exhaust cam phasers 158, 160 based on signals from the ECM 136. When implemented, variable valve lift may also be controlled by the valve actuator module 162.

The valve actuator module 162 may deactivate the cylinder 138 by disabling opening of the intake valve 142 and/or the exhaust valve 150. The valve actuator module 162 may disable opening of the intake valve 142 by decoupling the intake valve 142 from the intake cam phaser 158. Similarly, the valve actuator module 162 may disable opening of the exhaust valve 150 by decoupling the exhaust valve 150 from the exhaust cam phaser 160. In various implementations, the valve actuator module 162 may control the intake valve 142 and/or the exhaust valve 150 using devices other than camshafts, such as electromagnetic or electrohydraulic actuators.

The ECM 136 adjusts the position of the throttle valve 134, the amount and/or timing of fuel injections performed by the fuel injector 146, the timing at which spark is generated by the spark plug 148, and/or the timing at which the intake and exhaust valves 142 and 150 are opened to achieve a target torque output of the engine 114.

The ECM 136 determines the target engine torque based on the driver input and/or the first input from the DCM 130. The ECM 136 may determine whether to determine the target engine torque based on the driver input or the first input based on a second input from the DCM 130. The DCM 130 may control whether the ECM 136 uses the driver input or the first input to determine the target engine torque based on whether the driver's foot is on the accelerator pedal. The DCM 130 may determine that the driver's foot is on the accelerator pedal when the accelerator pedal position indicates a pedal depression level that is greater than a predetermined amount.

Torque output at the crankshaft 140 is transferred through the torque converter 118, through the transmission 120, through the driveline 122, and to the wheels 124. The driveline 122 includes a drive shaft 164, a differential 166, and axle shafts 168. The torque converter 118, the transmission 120, and the differential 166 amplify engine torque by several gear ratios to provide axle torque at the axle shafts 168. The axle torque rotates the wheels 124, which causes the vehicle 110 to accelerate in a forward or rearward direction.

The friction brakes 125 are mounted to the wheels 124. The friction brakes 125 resist (slow) rotation of the wheels 124 when the friction brakes 125 are applied. The friction brakes 125 may include drum brakes and/or disc brakes, and may include electrohydraulic actuators and/or electromechanical actuators that press a brake pad against a brake disc and/or drum when the friction brakes 125 are applied. A brake actuator module 170 applies the friction brakes 125 based on a brake pedal position and/or a signal from the DCM 130. The friction brakes 125 may be independently applied at different levels. The DCM 130 may apply the friction brakes 125, for example, to maintain the target vehicle speed and/or to maintain at least the predetermined distance between the vehicle and an object in front of the vehicle 110.

The steering system 126 selectively turns the front wheels 124, thereby turning the vehicle 110. The steering system 126 includes a steering wheel 172, a steering column 174, one or more steering linkages 176, and a steering actuator 178. A driver may rotate the steering wheel 172 to turn the vehicle 110 left or right or to input a request to turn the vehicle 110 left or right. The steering column 174 is coupled to the steering wheel 172 so that the steering column 174 rotates when the steering wheel 172 is rotated. The steering column 174 may also be coupled to the steering linkages 176 so that rotation of the steering column 174 causes translation of the steering linkages 176. The steering linkages 176 are coupled to the front wheels 124 so that translation of the steering linkages 176 turns the wheels 124.

The steering actuator 178 is coupled to the steering linkages 176 and translates the steering linkages 176, thereby turning the front wheels 124. In various implementations, the steering actuator 178 may be an electrohydraulic and/or electromechanical actuator. In implementations where the steering column 174 is coupled to the steering linkages 176, such as power steering systems, the steering actuator 178 may reduce the amount of effort that the driver must exert to turn the vehicle 110 left or right. In various implementations, the steering column 174 may not be coupled to the steering linkages 176, and the steering actuator 178 alone may translate the steering linkages 176. Steering systems where the steering column 174 is not coupled to the steering linkages 176 may be referred to as a steer-by-wire system.

A steering actuator module 180 adjusts actuation of the steering actuator 178 based on a signal from the DCM 130. The DCM 130 may control the steering actuator 178 based on the angular position of the steering wheel 172. Alternatively, the DCM 130 may control the steering actuator 178 autonomously (e.g., independent of the angular position of the steering wheel 172). For example, the DCM 130 may control the steering actuator 178 to minimize a difference between a target path of the vehicle 110 and an actual path of the vehicle 110 or to center the vehicle 110 between lane lines. As another example, the DCM 130 may control the steering actuator 178 to cause the vehicle to not contact one or more targets located in the path of the vehicle.

One or more wheel speed sensors 182 are mounted to one or more of the wheels 124 and measures the speed of wheels 124, respectively. For example, one wheel speed sensor may be provided for each wheel and measure that wheels wheel speed.

A forward facing ultra short range radar (USRR) sensor 184 transmits and receives signals within a predetermined field of view (FOV) in front of the vehicle 110. The predetermined FOV may be limited, for example, to approximately 15-20 meters in front of the vehicle. The forward facing USRR sensor 184 may be located, for example, in a front fascia of the vehicle 110, in a rear view mirror inside of a front wind shield of the vehicle, or at another suitable location. The vehicle 110 may also include one or more other USRR sensors with different predetermined FOVs, such as a rear facing USRR sensor and/or side facing USRR sensors.

The vehicle 110 may also include one or more other types of object sensors. For example, side facing cameras 186 and 187 may be mounted to the left and right sides of the vehicle body 112 and generate images of the environment on the left and right sides of the vehicle 110, respectively. The side facing cameras 186 and 187 may be implemented under left and right outside rear view mirrors, respectively, of the vehicle.

An accelerometer may be mounted to (e.g., the rear of) the vehicle body 112 and measures the lateral, longitudinal, and/or vertical acceleration of the vehicle 110. The accelerometer may include a triaxial accelerometer, a dual-axis accelerometer, and/or one or more single-axis accelerometers. In one example, the accelerometer is a dual-axis accelerometer that measures the lateral and longitudinal acceleration of the vehicle 110.

A steering wheel angle sensor 189 measures the angular position of the steering wheel 172 relative to a predetermined position. The predetermined position may correspond to a location where the vehicle should (or does) travel straight along a longitudinal axis of the vehicle. The steering wheel angle sensor 190 may be mounted to the steering column 174 and may include, for example, a Hall Effect sensor that measures the angular position of a shaft that is disposed within the steering column 174 and rotatably coupled to the steering wheel 172.

A transmission control module (TCM) 192 shifts gears of the transmission 120 based on operating conditions of the vehicle 110 and a predetermined shift schedule. The operating conditions may include the speed of the vehicle 110, a target acceleration of the vehicle 110, and/or a target torque output of the engine 114. The TCM 192 may determine a vehicle speed based on wheel speeds measured using the wheel speed sensors 182. For example, the TCM 192 may determine the vehicle speed based on an average of the wheel speeds or an average of speeds of undriven (i.e., non-driven) wheels of the vehicle. The TCM 192 may receive the target vehicle acceleration and/or the target engine torque from the DCM 130 and/or the ECM 136. The ECM 136 may communicate with the TCM 192 to coordinate shifting gears in the transmission 120. For example, the ECM 136 may reduce engine torque during a gear shift.

The DCM 130 may adjust the target path of the vehicle 110, for example, to maintain the vehicle 110 within the boundaries of a lane in which the vehicle 110 is travelling or to avoid one or more objects in the present path of the vehicle 110. The DCM 130 may activate the driver warning device 128 to notify the driver of a potential lane departure.

The driver warning device 128 may include an electronic display (e.g., a touchscreen display) that is within the view of the driver and is operable to display lights, text, and/or images. Additionally or alternatively, the driver warning device 128 may include a heads-up display (HUD) that, for example, projects light, text, and/or images onto a windshield (not shown) of the vehicle 110. Additionally or alternatively, the driver warning device 128 may include one or more vibrators mounted to, for example, the steering wheel 172 and/or the driver's seat (not shown) to provide haptic feedback to the driver. Additionally or alternatively, the driver warning device 128 may include an audio system (e.g., including an audio driver and a speaker) that is operable to output a sound or audible message within the vehicle 110.

The USRR sensor 184 detects targets within its predetermined FOV in front of the vehicle based on the received signals. The USRR sensor 184 provides target data 190 indicative of the detected targets. The target data 190 may include, for example, a location of each detected target relative to the vehicle 110. The detection of targets by the USRR sensor 184 is discussed further below.

Figure 2:
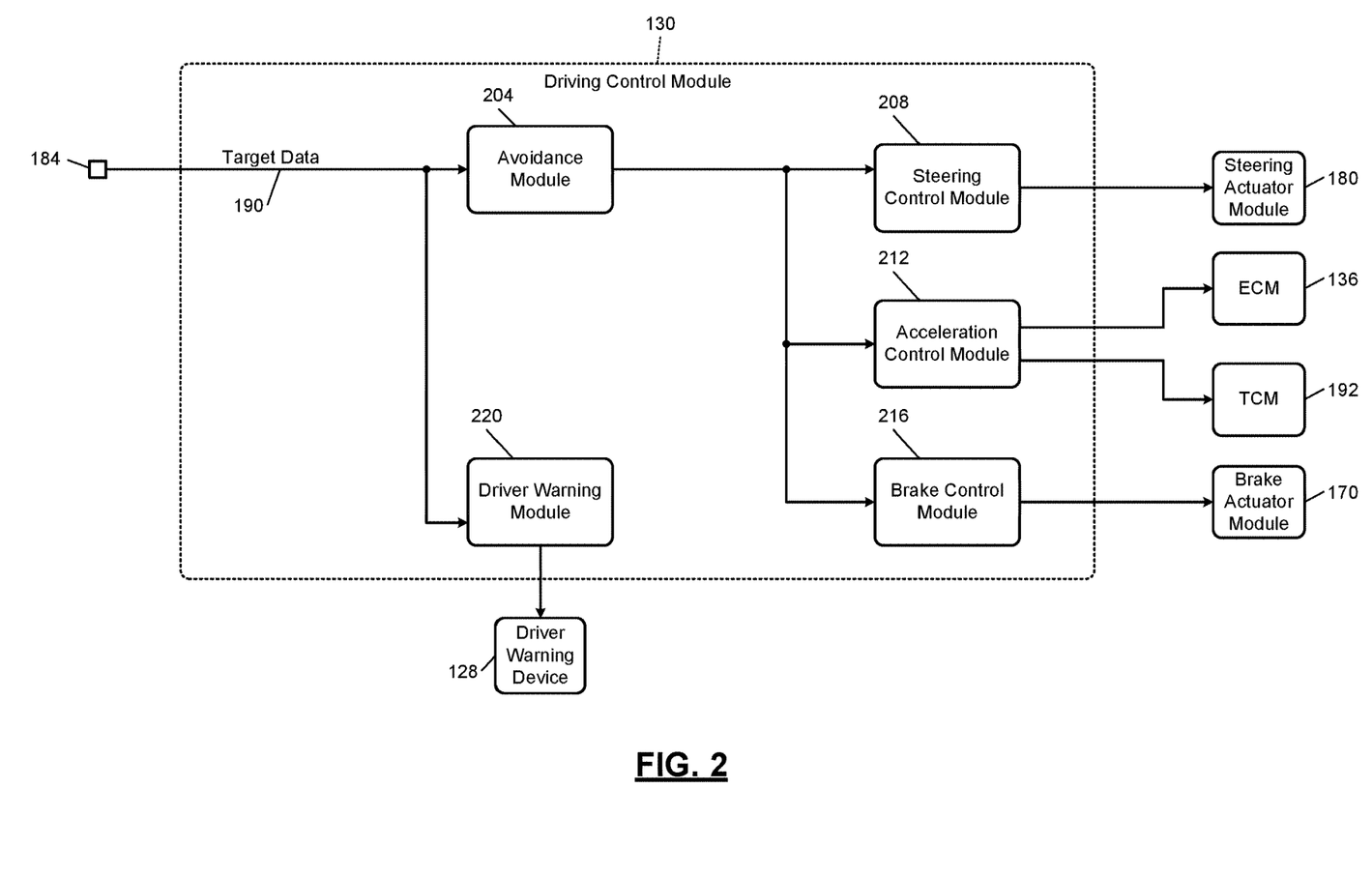
FIG. 2 is a functional block diagram of an example implementation of a driving control module.

FIG. 2 includes a functional block diagram of an example implementation of the DCM 130. An avoidance module 204 receives the target data 190 from the USRR sensor 184. The avoidance module 204 may adjust one or more vehicle operating parameters based on the target data 190 to cause the vehicle to not contact any objects/targets identified by the USRR sensor 184.

For example, the avoidance module 204 may selectively prompt a steering control module 208 to steer the vehicle 110 left or right to avoid a target identified by the USRR sensor 184. The steering control module 208 steers the vehicle 110 left or right via the steering actuator module 180 based on input from the avoidance module 204. Additionally or alternatively, the avoidance module 204 may selectively prompt an acceleration control module 212 to decelerate the vehicle 110 or prevent acceleration of the vehicle 110 to avoid a target identified by the USRR sensor 184. The acceleration control module 212 decelerates the vehicle 110 or prevents vehicle acceleration based on input from the avoidance module 204. The acceleration control module 212 may decelerate the vehicle 110 or prevent acceleration, for example, by adjusting one or more engine actuators (via the ECM 136) and/or adjust one or more transmission actuators (via the TCM 192). The engine actuators may include, for example, the throttle valve 134, the fuel injectors, the spark plugs, camshaft phasers, and/or other types of engine actuators. The transmission actuators may include, for example, gear ratio, one or more clutches, and/or other types of transmission actuators. Additionally or alternatively, the avoidance module 204 may selectively prompt a brake control module 216 to apply the friction brakes 125 to avoid a target identified by the USRR sensor 184. The brake control module 216 applies the friction brakes 125 via the brake actuator module 170 based on input from the avoidance module 204.

One or more other actions may additionally or alternatively be taken based on the target data 190. For example, a driver warning module 220 may activate the driver warning device 128 based on the target data 190. For example, the driver warning module 226 may activate the driver warning device 128 when the target data 190 indicates that a target (object) is located less than a predetermined distance in front of the vehicle. Activation of the driver warning device 128 may include, for example, at least one of activating a flashing light, activating a haptic device, and outputting an audible warning. One or more other actions may additionally or alternatively be taken based on the target data 190.

Figure 3:
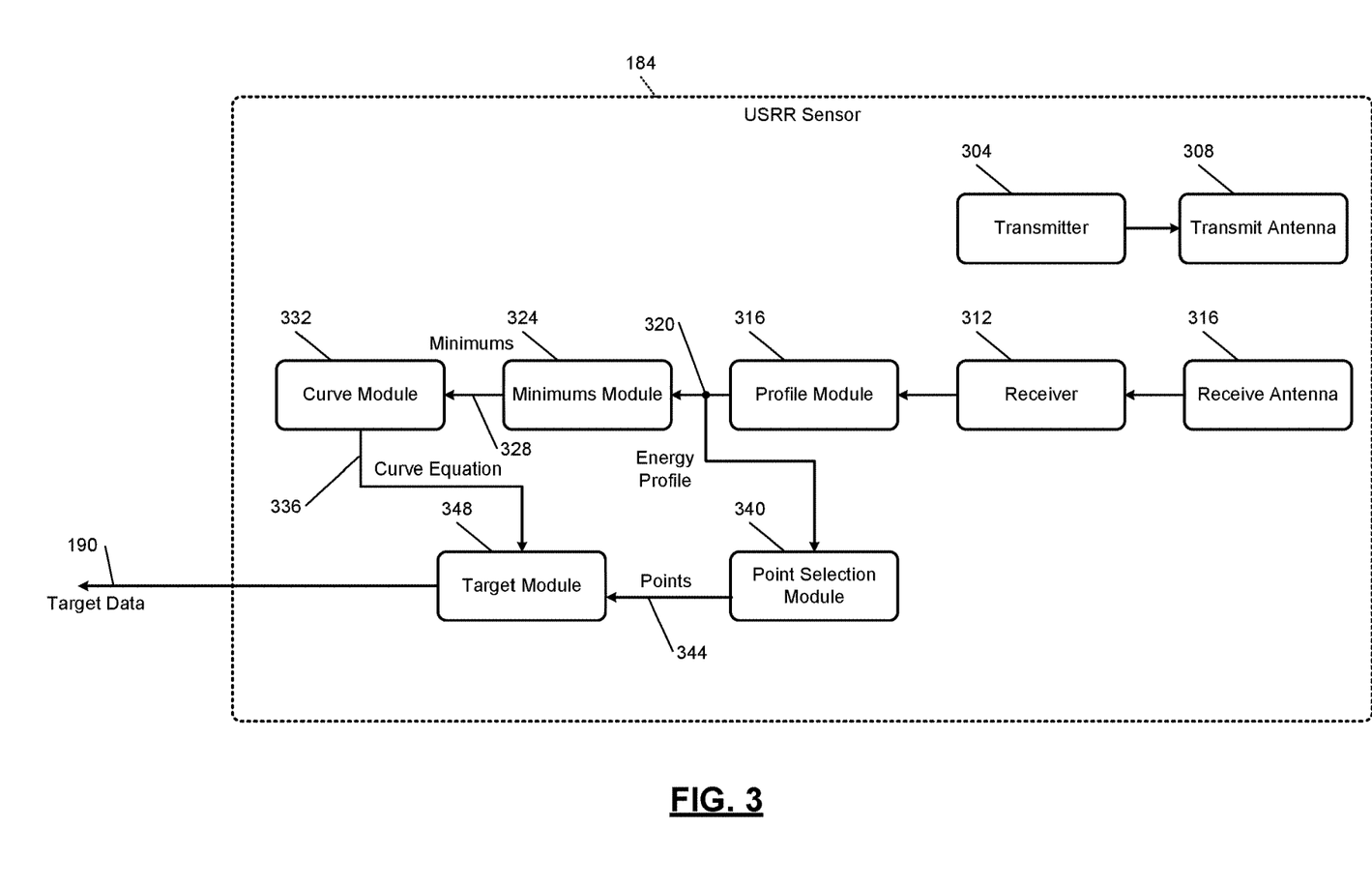
FIG. 3 is a functional block diagram of an example implementation of an ultra short range radar (USRR) sensor.

FIG. 3 is a functional block diagram of an example implementation of the USRR sensor 184. A transmitter 304 transmits USRR signals in the predetermined FOV via one or more transmit antennas, such as transmit antenna 308. A receiver 312 receives signals reflected back to the vehicle 110 from within the predetermined FOV via one or more receive antennas, such as receive antenna 316.

A profile module 316 generates an energy profile 320 based on the signals reflected back to the vehicle 110 and received by the receive antenna(s). The profile module 316 may additionally generate the energy profile 320 based on the USRR signals transmitted.

The energy profile 320 includes a plurality of points at various distances (or distance ranges/bins) in front of the vehicle 110. Each of the points is for one of the distances and includes an energy based on the signals reflected back to the vehicle 110 at that distance. The profile module 316 updates the energy profile 320 every predetermined period.

Figure 4:
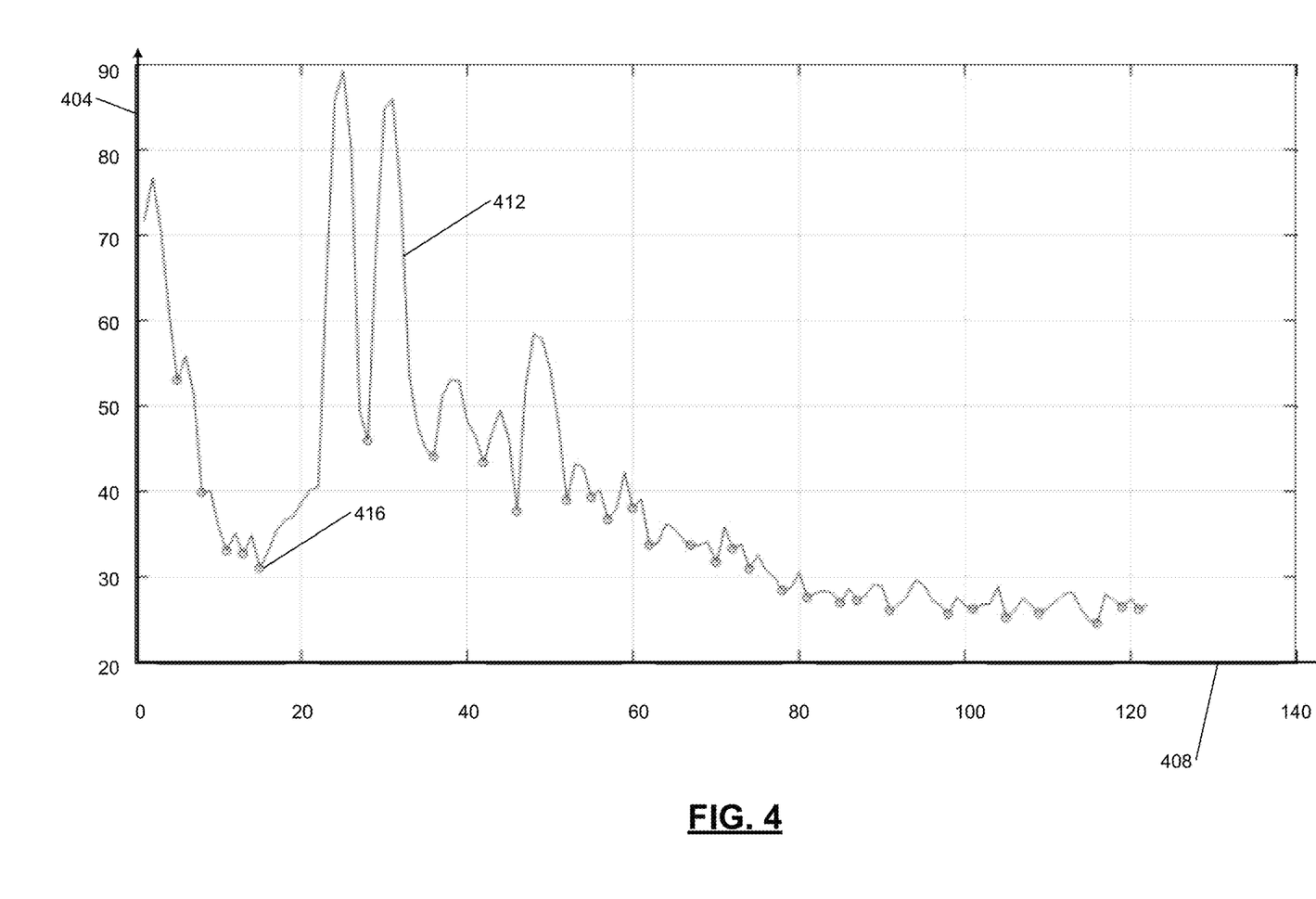
FIGS. 4 and 5 include an example graph of energy of the received signals versus distance in front of the vehicle.

FIG. 4 includes an example graph of energy (in decibels, dB) 404 of the received signals versus distance 408 in front of the vehicle. Trace 412 is an example of the energy profile 320 generated by the profile module 316 based on the signals reflected back to the vehicle 110.

Referring back to FIG. 3, a minimums module 324 identifies local minimums 328 in the energy profile 320. The local minimums 328 may be points of the energy profile 320 where both (i) the energy of the point immediately before that point is greater than the energy at that point and (ii) the energy of the point immediately after that point is greater than that the energy at that point. In other words, an energy (at a first distance x) in the energy profile 320 may be identified as a local minimum when a second energy (at a second distance x−1) immediately before the energy is greater than the energy and a third energy (at a third distance x+1) immediately after the energy is greater than the energy.

The local minimums 328 of the example energy profile 412 of FIG. 4 are indicated by circles, such as circle 416.

The minimums module 324 provides the local minimums 328 of the energy profile 320 as a list to a curve module 332. The curve module 332 determines a curve equation 336 (e.g., a polynomial equation) for a curve fit to the local minimums 328 using a curve fitting algorithm. For example only, the curve fitting algorithm may include a least squares algorithm, a least mean squares algorithm, or another suitable type of curve fitting algorithm. In the example of the least squares algorithm, the estimation may be represented by:

$$\underbrace{\begin{bmatrix} x[1]^3 & x[1]^2 & x[1] & 1 \\ x[2]^3 & x[2]^2 & x[2] & 1 \\ \cdots & \cdots & \cdots & \cdots \\ x[N]^3 & x[N]^2 & x[N] & 1 \end{bmatrix}}_{A} \underbrace{\begin{bmatrix} a \\ b \\ c \\ d \end{bmatrix}}_{X} = \underbrace{\begin{bmatrix} E\{x[1]\} \\ E\{x[2]\} \\ \cdots \\ E\{x[N]\} \end{bmatrix}}_{Y}$$

$$\boxed{X = (A^T A)^{-1} A^T Y}$$

where A is a range matrix, N is a number of local minimums, E is the energy and is a range of the range/distance x, and Y is the energy vector.

The curve equation 336 provides energy (baseline energy) as a function of distance. As an example only, the polynomial equation may take the form of:

$$e(d)=x1*d+x2*d^2\ldots,$$

where e(d)=is the energy (a baseline energy) at a distance (d), x1 is a first predetermined coefficient value, d is the distance, x2 is a second predetermined coefficient value, etc.

Figure 5:
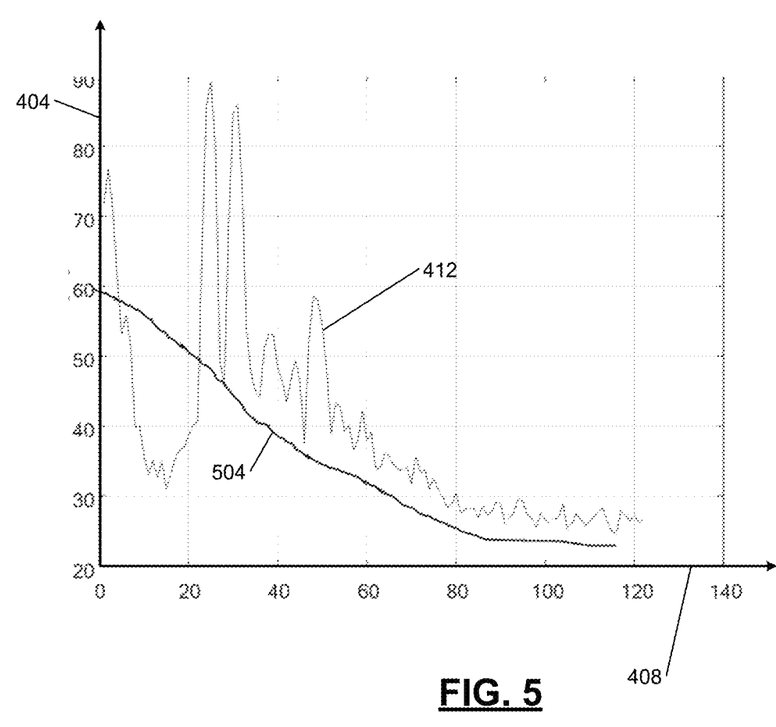

FIG. 5 includes an example of the graph of FIG. 4. In FIG. 5, trace 504 is an example curve that has been fit to the example energy profile 412. In the example of FIG. 5, the curve equation 336 would correspond to the example curve 504 and create the example curve 504 by inputting the various distances and connecting the determined energy values.

Figure 6:
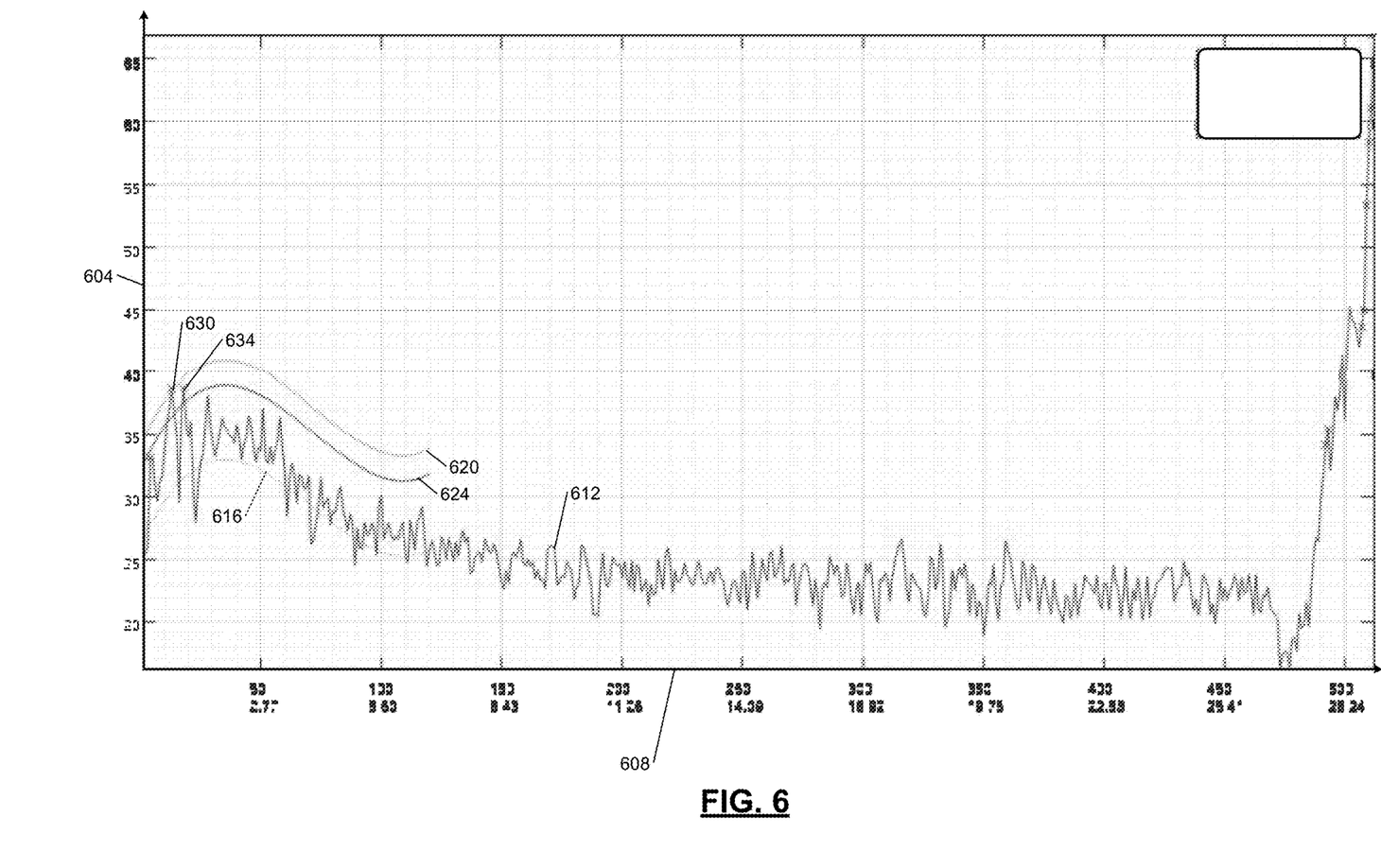
FIG. 6 includes another example graph of energy of the received signals versus distance in front of the vehicle.

FIG. 6 includes another example graph of energy (in decibels, dB) 604 of the received signals versus distance 608 in front of the vehicle. Trace 612 is an example of the energy profile 320 generated by the profile module 316. Trace 616 is an example curve that has been fit to the example energy profile 612.

Referring back to FIG. 3, a point selection module 340 selects suspected points 344 of the energy profile 320 suspected to be indicative of an object having at least predetermined dimensions in the predetermined FOV of the USRR sensor 184. Each of the suspected points 344 includes the distance and the (Doppler) energy at that distance. The point selection module 340 may set the suspected points 344, for example, as all of the points of the energy profile 320 having a magnitude that are greater than a predetermined energy, all of the points where increases in energy occur, or all of the points satisfying one or more other predetermined criteria.

A target module 348 individually determines and indicates whether the suspected points 344 are targets or not targets (e.g., noise) based on the suspected points 344, respectively, and the curve equation 336.

For one of the suspected points 344 at a distance, the target module 348 (1) determines a baseline energy at that distance from the curve equation 336 by solving the curve equation 336 using that distance. The baseline energy is one of the points that makes up the curve fit to the local minimums 328. The target module 348 (2) determines first and second threshold values for that distance by adding first and second predetermined values, respectively, to the baseline energy at that distance. The target module 348 may set the first threshold value based on or equal to the first predetermined value plus the baseline energy and set the second threshold value based on or equal to the second predetermined value plus the baseline energy. The first predetermined value is greater than the second predetermined value. For example only, the first predetermined value may be equal to or approximately equal to 7 dB or another suitable value, and the second predetermined value may be equal to or approximately equal to 5 dB or another suitable value. FIG. 6 includes an example trace 620 tracking the first predetermined value at various distances and an example trace 624 tracking the second predetermined value at the various distances, respectively. The target module 348 (3) determines whether the one of the suspected points 344 at the distance is a local maximum. The target module 348 may determine that a point is a local maximum when the energy at that distance (x) is greater than the energy at the distance immediately before that point (x−1) in the energy profile 320 and is greater than the energy at the distance that is immediately after that point (x+1) in the energy profile 320. If the one of the suspected points 344 is not a local maximum, the target module 348 (4) determines and indicates that that one of the suspected points 344 is not a target (e.g., noise). If the one of the suspected points 344 is a local maximum, the target module 348 (5) determines and indicates that that one of the suspected points 344 is a target when one of (A) the energy of the one of the suspected points 344 is greater than the first threshold value at that distance and (B) the energy of the one of the suspected points 344 is less than the first threshold value at that distance, greater than the second threshold value at that distance, and distinguished. The target module 348 may determine that the one of the suspected points 344 is distinguished when the energy at that distance (x) is greater than both of the energies at the two distances immediately before (x−1) and (x−2) that distance in the energy profile 320 and/or greater than both of the energies at the two distances immediately after (x+1) and (x+2) that distance in the energy profile 320. If the one of the suspected points 344 is a local maximum but does not satisfy (A) or (B), the target module 348 determines and indicates that the one of the suspected points 344 is noise (and not a target). The target module 348 does the above for each of the suspected points 344. The target module 348 outputs the target data 190 indicative of targets identified, as described above. In the example of FIG. 6, example points 630 and 634 will both be identified as targets.

Figure 7:
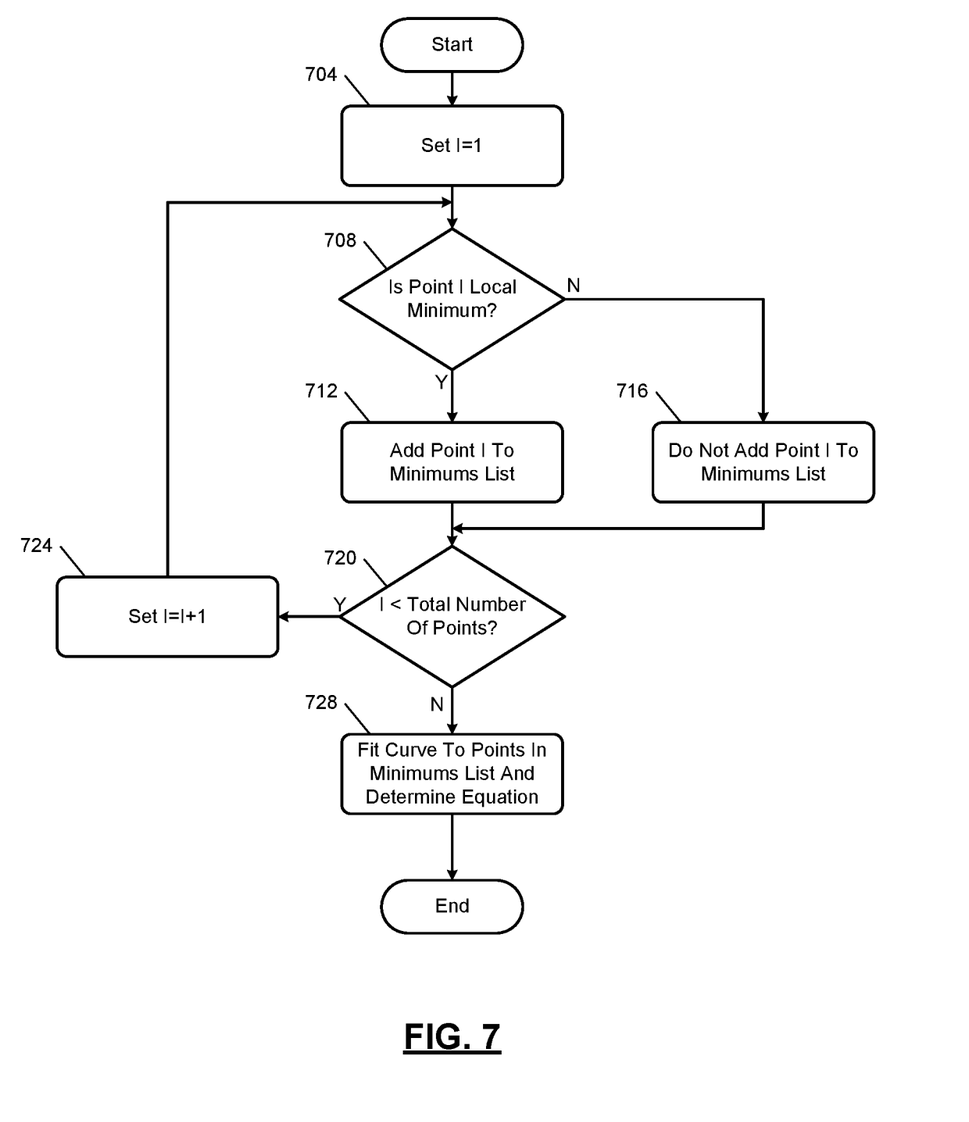
FIG. 7 includes a flowchart depicting an example method of determining a curve equation.

FIG. 7 includes a flowchart depicting an example method of determining the curve equation 336. The profile module 316 generates the energy profile 320 as described above. The energy profile 320 includes a plurality of points, where each point includes a distance and an energy of the received signals at that distance.

Control begins with 704 where the minimums module 324 sets a counter value (I) to 1. At 708, the minimums module 324 determines whether the I-th point of the energy profile 320 is a local minimum. The minimums module 324 may determine that the I-th point of the energy profile 320 is a local minimum when both (i) the energy at the (I−1)th point is greater than the energy at the I-th point and (ii) the energy at the (I+1)th point is greater than the energy at the I-th point. If 708 is true, the minimums module 324 adds the 1-th point to the list of local minimums 328 at 712, and control continues with 720. If 708 is false, the minimums module 324 does not add the I-th point to the list of local minimums 328 at 716, and control continues with 720.

At 720, the minimums module 324 determines whether I is less than a predetermined total number of points included in each energy profile. If 720 is true, the minimums module 324 increments the counter value (I) by 1 (e.g., sets I=I+1) at 724, and control returns to 708. In this manner, the minimums module 324 determines whether each point in the energy profile 320 is a local minimum. If 720 is true, the minimums module 324 prompts the curve module 332 to determine the curve equation 336, and control continues with 728.

At 728, the curve module 332 fits the curve to the local minimums 328 and determines the curve equation 336 for the curve fit to the local minimums 328. The curve module 332 may determine the curve equation 336, for example, using a least squares algorithm, a least mean squares algorithm, or another suitable type of curve fitting. While control is shown as ending after 728, control may return to 704 for a next energy profile.

Figure 8:
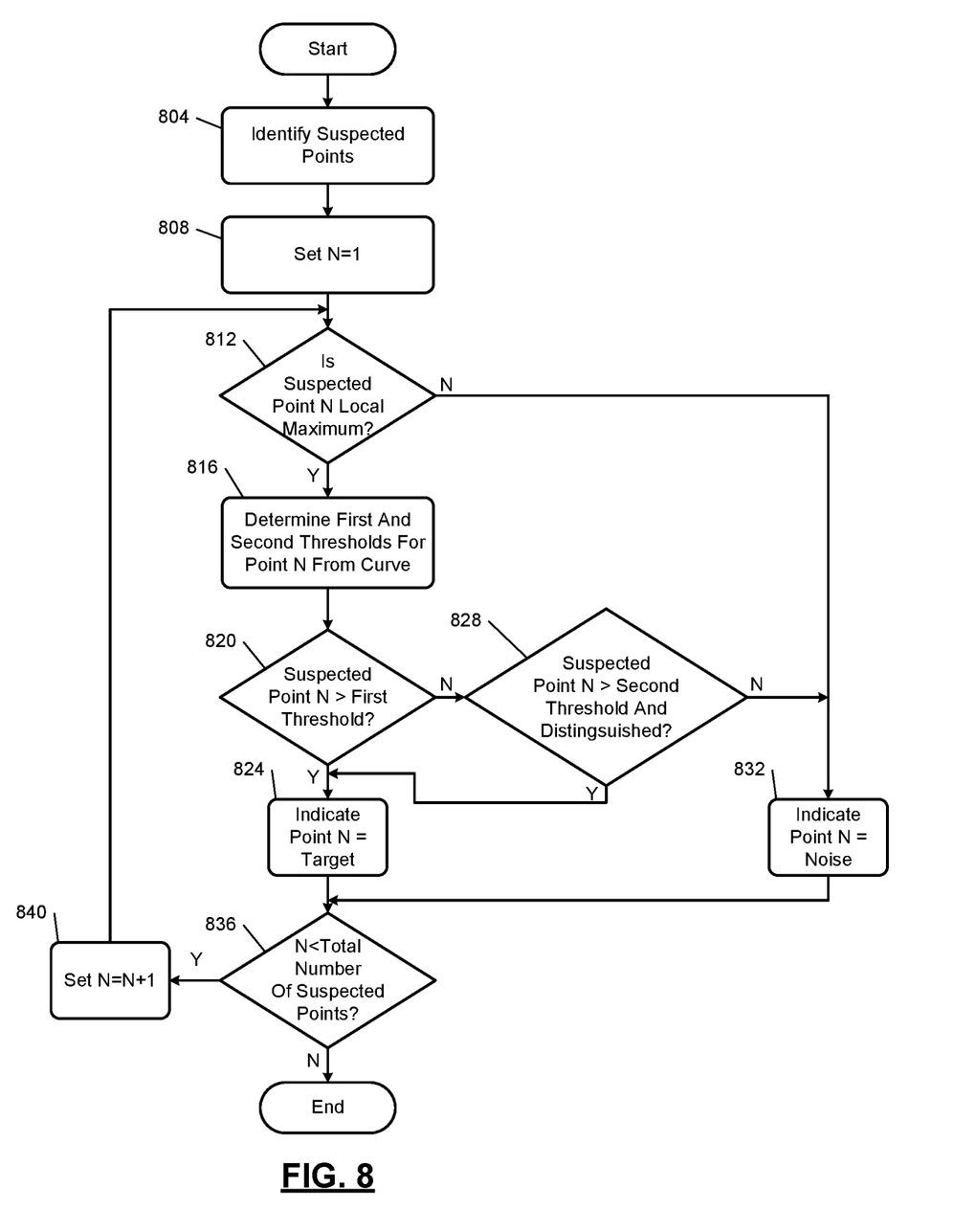
FIG. 8 includes a flowchart depicting an example method of determining and indicating whether or not points of an energy profile are targets.

FIG. 8 includes a flowchart depicting an example method of determining and indicating whether points of the energy profile 320 are targets or not. Control begins with 804 where the point selection module identifies the suspected points 344 in the energy profile 320. At 808, the target module 348 sets a counter value (N) to 1. At 812, the target module 348 determines whether the N-th one of the suspected points 344 is a local maximum. The target module 348 may determine that the N-th one of the suspected points 344 is a local maximum when both (i) the energy at the (N−1)th point is less than the energy at the N-th point and (ii) the energy at the (N+1)th point is less than the energy at the N-th point. If 812 is false, control transfers to 832, which is discussed further below. If 812 is true, control continues with 816.

At 816, the target module 348 determines the first and second threshold values at the distance of the N-th one of the suspected points 344. The target module 348 may set the first threshold value equal to the baseline energy at the distance of the N-th one of the suspected points 344 plus the first predetermined value (e.g., 7 dB) and set the second threshold value equal to the baseline energy at the distance of the N-th one of the suspected points 344 plus the second predetermined value (e.g., 5 dB). The target module 348 determines the baseline energy from the curve equation 336 as a function of the distance of the N-th one of the suspected points 344.

At 820, the target module 348 determines whether the energy of the N-th one of the suspected points 344 is greater than the first threshold value for the N-th one of the suspected points 344. If 820 is true, the target module 348 generates the target data 190 to indicate the presence of a target at the distance of the N-th one of the suspected points 344 at 824. If 820 is false, control continues with 828.

At 828, the target module 348 determines whether both (i) the energy of the N-th one of the suspected points 344 is greater than the second threshold value for the N-th one of the suspected points 344 and (ii) the N-th one of the suspected points 344 is distinguished. The target module 348 may determine that the N-th one of the suspected points 344 is distinguished when at least one of: (i) the energy at N-th one of the suspected points 344 is greater than the energies at the two points of the energy profile 320 immediately before the N-th one of the suspected points 344 and (ii) the energy at N-th one of the suspected points 344 is greater than the energy at the two points of the energy profile 320 immediately after the N-th one of the suspected points 344. If 828 is true, the target module 348 generates the target data 190 to indicate the presence of a target at the distance of the N-th one of the suspected points 344 at 824. If 828 is false, control continues with 832.

At 832, the target module 348 determines that the N-th one of the suspected points 344 is not a target and the target module 348 generates the target data 190 to indicates that the N-th one of the suspected points 344 is not a target (e.g., noise). As such the target module 348 does not generate the target data 190 to indicate the presence of a target at the distance of the N-th one of the suspected points 344.

At 836, the target module 348 determines whether N is less than a total number of the suspected points 344. If 836 is true, the target module 348 increments the counter value (NI) by 1 (e.g., sets N=N+1) at 840, and control returns to 812. In this manner, the target module 348 determines whether each of the suspected points 344 is or is not indicative of a target in the predetermined FOV of the USRR sensor 184. If 836 is true, the control may end. While control is shown as ending after 836, control may return to 804 for a next energy profile.

While the above is described in conjunction with the example of the USRR sensor 184, the above is also applicable to other types of radar sensors and is not limited to USRR sensors.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A vehicle comprising:
   a radar sensor comprising:
      a transmitter configured to transmit radar signals in a predetermined field of view (FOV) via a transmit antenna;
      a receiver configured to receive signals reflected back to the radar sensor via a receive antenna;
      a profile module configured to generate an energy profile including a plurality of points for a plurality of distances from the radar sensor, respectively, each of the points including an energy of the signals reflected back to the radar sensor for that one of the plurality of distances;
      a minimums module configured to identify ones of the plurality of points having local minimums of energy;
      a curve module configured to, based on the plurality of points having local minimums of energy, generate an equation representative of a curve fit to the plurality of points having local minimums of energy,
         wherein the equation relates distance from the radar sensor to baseline energy of the signals reflected back to the radar sensor; and
      a target module configured to selectively output a target signal indicative of the presence of a target using the equation; and
   at least one of:
      a steering control module configured to selectively adjust steering of the vehicle based on the target signal;
      a brake control module configured to selectively apply brakes of the vehicle based on the target signal; and
      an acceleration control module configured to selectively decelerate the vehicle based on the target signal.

2. The vehicle of claim 1 wherein the minimums module is configured to generate the equation using a least squares algorithm.

3. The vehicle of claim 1 wherein the minimums module is configured to generate the equation using a least mean squares algorithm.

4. The vehicle of claim 1 wherein the target module is configured to:
   determine a baseline energy for one of the plurality of points at one of the plurality of distances from the radar sensor using the equation and the one of the plurality of distances;
   determine a first threshold value based on the baseline energy and a first predetermined value; and
   output the target signal indicative of the presence of the target at the one of the distances from the radar sensor when the energy at the one of the plurality of distances is greater than the first threshold value.

5. The vehicle of claim 4 wherein the target module is configured to:
   determine a second threshold value based on the baseline energy and a second predetermined value; and
   selectively output the target signal indicative of the presence of the target at the one of the distances from the radar sensor when the energy at the one of the plurality of distances is greater than the second threshold value.

6. The vehicle of claim 5 wherein the target module is configured to output the target signal indicative of the presence of the target at the one of the distances from the radar sensor when the energy at the one of the plurality of distances is less than the first threshold value and greater than the second threshold value.

7. The vehicle of claim 5 wherein the first predetermined value is greater than the second predetermined value.

8. The vehicle of claim 7 wherein the target module is configured to set the first threshold value based on the baseline energy plus the first predetermined value.

9. The vehicle of claim 8 wherein the target module is configured to set the second threshold value based on the baseline energy plus the second predetermined value.

10. The vehicle of claim 4 wherein the target module is configured to set the first threshold value based on the baseline energy plus the first predetermined value.

11. The vehicle of claim 1 further comprising:
    a driver warning module configured to selectively output a warning via a driver warning device based on the target signal.

12. The A-vehicle of claim 1, wherein the vehicle includes all of:
    the steering control module configured to selectively adjust steering of the vehicle based on the target signal;
    the brake control module configured to selectively apply brakes of the vehicle based on the target signal; and
    the acceleration control module configured to selectively decelerate the vehicle based on the target signal.

13. The vehicle of claim 1 wherein the equation is a polynomial equation.

14. The vehicle of claim 1 wherein the radar sensor further comprises:
    the transmit antenna; and
    the receive antenna.

15. A vehicle comprising:
    a radar sensor comprising:
       a transmit antenna;
       a transmitter configured to transmit radar signals in a predetermined field of view (FOV) via the transmit antenna;

a receive antenna;

a receiver configured to receive signals reflected back to the radar sensor via the receive antenna;

a profile module configured to generate an energy profile including a plurality of points for a plurality of distances from the radar sensor, respectively, each of the points including an energy of the signals reflected back to the radar sensor for that one of the plurality of distances;

a minimums module configured to identify ones of the plurality of points having local minimums of energy;

a curve module configured to, based on the plurality of points having local minimums of energy, generate a polynomial equation representative of a curve fit to the plurality of points having local minimums of energy, wherein the polynomial equation relates distance from the radar sensor to baseline energy of the signals reflected back to the radar sensor; and a target module configured to selectively output a target signal indicative of the presence of a target using the equation; and at least one of:

a steering control module configured to selectively adjust steering of the vehicle based on the target signal;

a brake control module configured to selectively apply brakes of the vehicle based on the target signal; and an acceleration control module configured to selectively decelerate the vehicle based on the target signal.

16. The vehicle of claim 15 wherein the target module is configured to:

determine a baseline energy for one of the plurality of points at one of the plurality of distances from the radar sensor using the polynomial equation and the one of the plurality of distances;

determine a first threshold value based on the baseline energy and a first predetermined value;

determine a second threshold value based on the baseline energy and a second predetermined value that is less than the first predetermined value; and selectively output the target signal indicative of the presence of the target at the one of the distances from the radar sensor based on at least one of:

a first comparison of the energy at the one of the plurality of distances and the first threshold value; and a second comparison of the energy at the one of the plurality of distances and the second threshold value.

17. The vehicle of claim 15, wherein the vehicle includes all of:

the steering control module configured to selectively adjust steering of the vehicle based on the target signal;

the brake control module configured to selectively apply brakes of the vehicle based on the target signal; and the acceleration control module configured to selectively decelerate the vehicle based on the target signal.

\* \* \* \* \*